(12) United States Patent
Reunamäki et al.

(10) Patent No.: US 10,517,064 B2
(45) Date of Patent: Dec. 24, 2019

(54) DATA PACKAGE PREPARATION

(71) Applicant: Nokia Technologies Oy, Espoo (FI)

(72) Inventors: Jukka Reunamäki, Tampere (FI); Arto Palin, Akaa (FI); Teemu Savolainen, Nokia (FI); Juha Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/576,458

(22) PCT Filed: May 22, 2015

(86) PCT No.: PCT/FI2015/050350
§ 371 (c)(1),
(2) Date: Nov. 22, 2017

(87) PCT Pub. No.: WO2016/189185
PCT Pub. Date: Dec. 1, 2016

(65) Prior Publication Data
US 2018/0160394 A1 Jun. 7, 2018

(51) Int. Cl.
*H04W 64/00* (2009.01)
*G01S 3/16* (2006.01)
(Continued)

(52) U.S. Cl.
CPC ............. *H04W 64/006* (2013.01); *G01S 3/14* (2013.01); *G01S 3/16* (2013.01); *G01S 3/46* (2013.01);
(Continued)

(58) Field of Classification Search
CPC ........ H04B 1/10; H04B 7/0814; H04B 7/086; H04L 25/0204; H04L 25/03866;
(Continued)

(56) References Cited

U.S. PATENT DOCUMENTS

2011/0151781 A1* 6/2011 Kainulainen ............. G01S 3/16
455/41.2
2012/0257508 A1 10/2012 Reunamaki et al.

FOREIGN PATENT DOCUMENTS

EP 1648128 A2 4/2006
EP 2509343 A1 1/2010
(Continued)

OTHER PUBLICATIONS

Extended European Search Report for European Patent Application No. 15893188.1, dated Jan. 3, 2019, 7 pages.
(Continued)

*Primary Examiner* — Quan M Hua
(74) *Attorney, Agent, or Firm* — Locke Lord LLP

(57) ABSTRACT

Disclosed in this specification is a method comprising inserting an anti-whitened data portion into a data packet that is to be whitened by whitening to yield a whitened data packet for transmission (44) from a first radio communications apparatus (30) to a second radio communications apparatus (10), the anti-whitened data portion having been determined based on anti-whitening data received (43) from the second radio communications apparatus (10) at the first radio communications apparatus, wherein the anti-whitened data portion is obtainable from a specific data block by anti-whitening, the anti-whitening compensating for the whitening so that the whitened data packet comprises the specific data block in non-whitened form.

16 Claims, 4 Drawing Sheets

(51) Int. Cl.
    *G01S 3/46*          (2006.01)
    *H04L 1/00*          (2006.01)
    *G01S 3/14*          (2006.01)
    *H04L 29/06*        (2006.01)

(52) U.S. Cl.
    CPC ............... *H04L 1/00* (2013.01); *H04L 69/22* (2013.01); *H04W 64/00* (2013.01); *H04L 2212/00* (2013.01)

(58) Field of Classification Search
    CPC ....... H04L 25/08; H04L 1/00; H04L 2212/00; H04L 69/22; H04W 4/80; H04W 64/00; H04W 64/006; H04W 4/008
    See application file for complete search history.

(56) References Cited

FOREIGN PATENT DOCUMENTS

| | | |
|---|---|---|
| EP | 2474834 A2 | 7/2012 |
| WO | 2010006651 A1 | 1/2010 |

OTHER PUBLICATIONS

International Search Report and Written Opinion received for corresponding Patent Cooperation Treaty Application No. PCT/FI2015/050350, dated Sep. 7, 2015, 14 pages.

\* cited by examiner

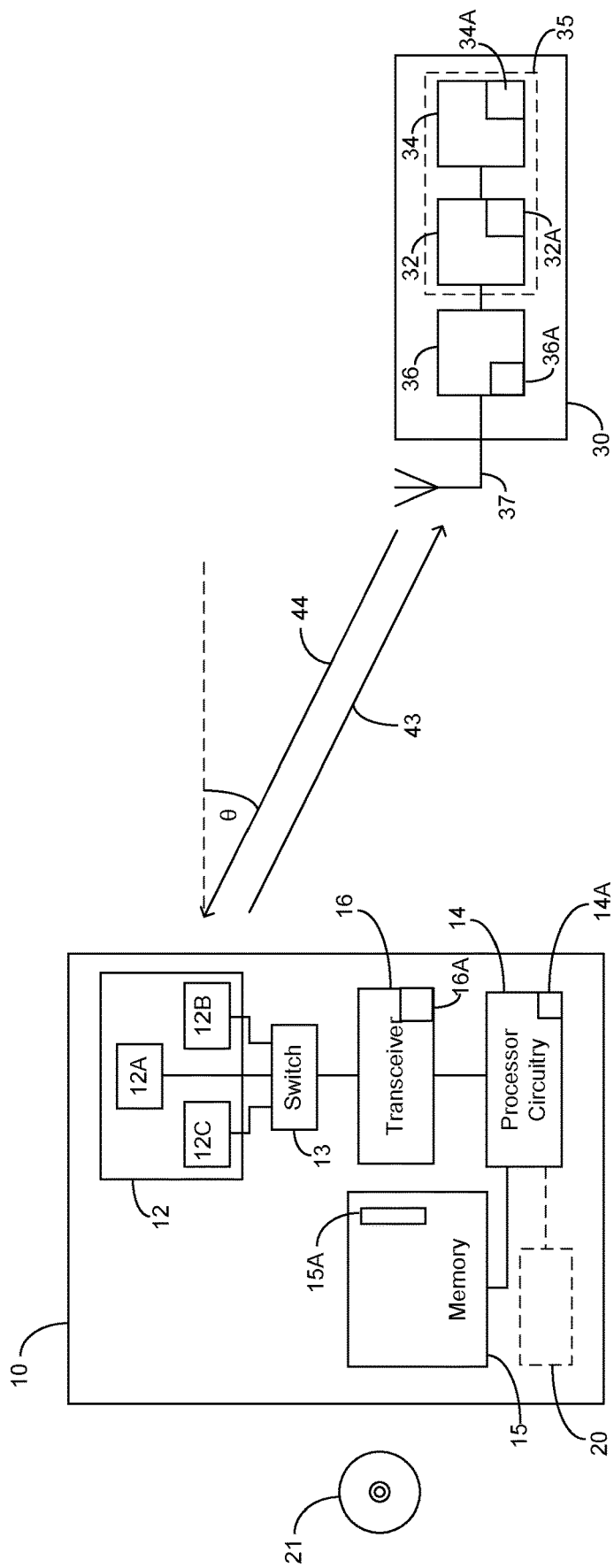

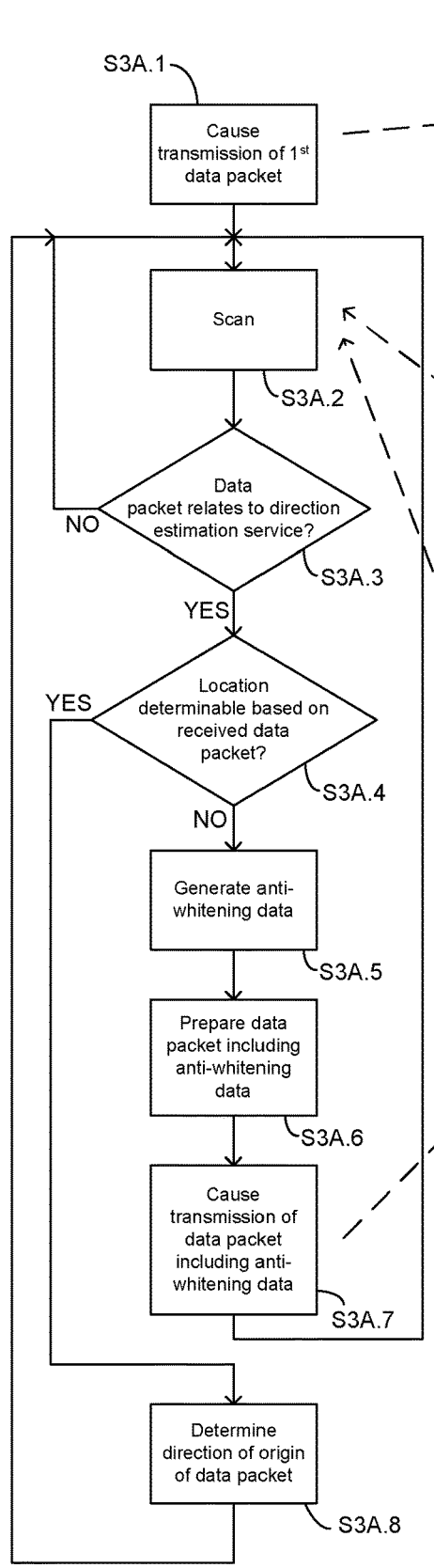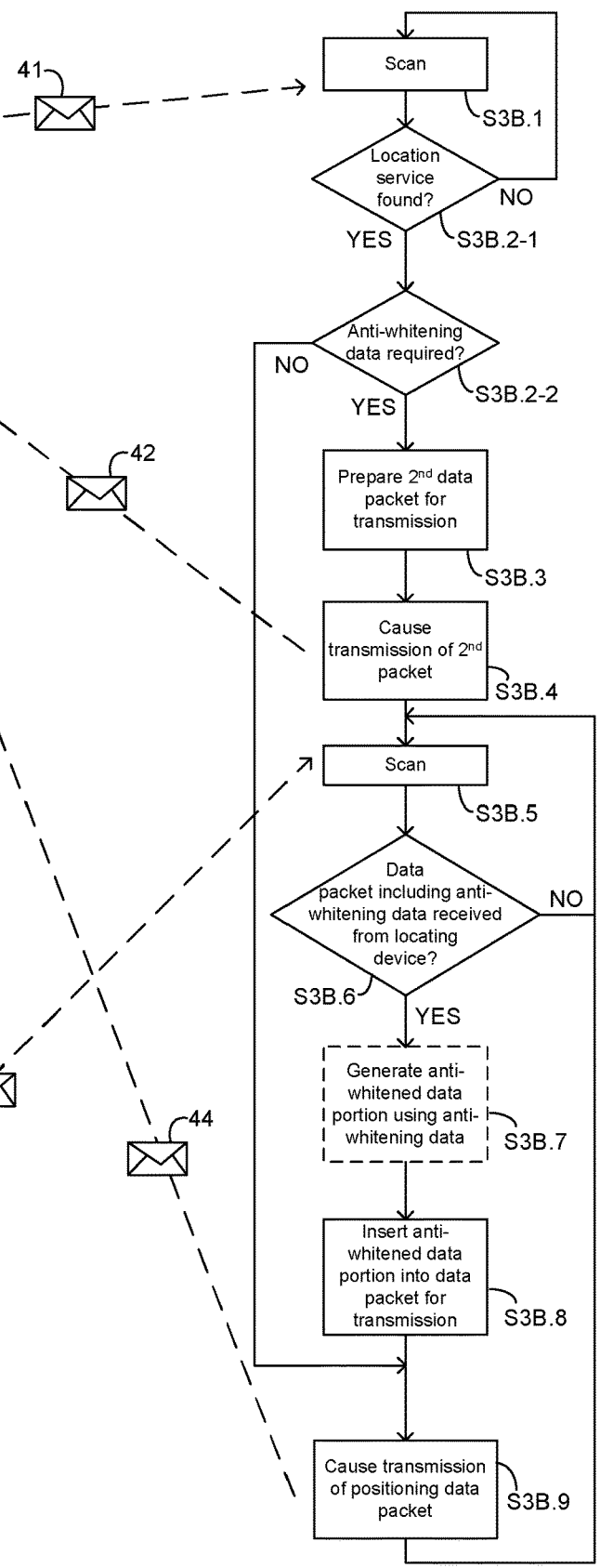
Figure 3A                    Figure 3B

DATA PACKAGE PREPARATION

RELATED APPLICATION

This application was originally filed as Patent Cooperation Treaty Application No. PCT/FI2015/050350 filed May 22, 2015.

FIELD

This specification relates generally to data packet preparation and, in particular but not necessarily exclusively, to data packet preparation for the purpose of compensating for data whitening.

BACKGROUND

High accuracy indoor positioning requires novel systems and solutions that are specifically developed for indoor positioning. The "traditional" positioning technologies used mainly outdoors, such as GPS, WiFi- and cellular-positioning technologies, generally cannot deliver a satisfactory performance indoors that would enable seamless navigation experience in both environments. Typically, there are issues with accuracy and coverage that are difficult to achieve with systems and signals that were not originally designed for the indoor use cases.

One of the most promising new solutions for indoor positioning is based on Bluetooth Low Energy (BLE) technology using an array of phased antennas. The antenna array is used to determine the angle-of-departure (AoD) or angle-of-arrival (AoA) of a received or transmitted signal. Based on this, and additional constraint information, the position of a device can be determined.

SUMMARY

In a first aspect, this specification describes a method comprising: inserting an anti-whitened data portion into a data packet that is to be whitened by whitening to yield a whitened data packet for transmission from a first radio communications apparatus to a second radio communications apparatus, the anti-whitened data portion having been determined based on anti-whitening data received from the second radio communications apparatus at the first radio communications apparatus, wherein the anti-whitened data portion is obtainable from a specific data block by anti-whitening, the anti-whitening compensating for the whitening so that the whitened data packet comprises the specific data block in non-whitened form. The method may additionally comprise enabling receipt at the first radio communications apparatus from the second radio communications apparatus of the anti-whitening data. The specific data block may be configured to be used by the second radio communications apparatus to estimate a direction towards the first radio communications apparatus based on a received representation of the specific data block.

The method may comprise preparing, for transmission from the first radio communications apparatus, a prior data packet for eliciting transmission of the anti-whitening data by the second radio communications apparatus to the first radio communications apparatus. The prior data packet may include a request for transmission of the anti-whitening data. The method may comprise determining whether the anti-whitening data is required to be received, and if it is determined that the anti-whitening data is required to be received, preparing for transmission the prior data packet including the request for transmission of the anti-whitening data. The method may further comprise, if it is determined that the anti-whitening data is not required to be received, preparing a positioning data packet for transmission from the first radio communications apparatus. The prior data packet may, in some examples, be a positioning data packet.

The received anti-whitening data may include the anti-whitened data portion for insertion into the data packet. Additionally or alternatively, the received anti-whitening data may include at least one parameter based on which the anti-whitened data portion for insertion into the data packet is able to be generated. The method may further comprise generating the anti-whitened data portion using the received anti-whitening data.

The method may further comprise responding to receipt at the first radio communications apparatus from the second radio communications apparatus of subsequently-received anti-whitening data, by inserting a subsequent anti-whitened data portion into a subsequent data packet that is to be whitened by whitening to yield a subsequent whitened data packet for transmission from the first radio communications apparatus to the second radio communications apparatus, the subsequent anti-whitened data portion having been determined based on the subsequently-received anti-whitening data.

In a second aspect, this specification describes a method comprising: preparing for transmission, from a second radio communications apparatus to a first radio communications apparatus, a data packet including anti-whitening data usable to determine an anti-whitened data portion for insertion into a second data packet that is to be whitened by whitening by the first radio communications apparatus to yield a whitened data packet which is to be transmitted from the first radio communications apparatus to the second radio communications apparatus, wherein the anti-whitened data portion is obtainable from a specific data block by anti-whitening, the anti-whitening compensating the whitening by the first radio communications apparatus so that the whitened data packet to be received at the second radio communications apparatus comprises the specific data block in non-whitened form. Additionally, the method may comprise causing transmission from the second radio communications apparatus to the first radio communications apparatus of the data packet including the anti-whitening data.

The specific data block may be configured to be used by the second radio communications apparatus to estimate a direction towards the first radio communications apparatus based on a received representation of the specific data block. In such examples, the method may further comprise using the specific data block to estimate a direction towards the first radio communications apparatus based on the received representation of the specific data block.

The method of the second aspect may further comprise enabling receipt of the whitened data packet including the specific data block in non-whitened form.

The method of the second aspect may further comprise preparing the data packet including anti-whitening data for transmission from the second radio communications apparatus to the first radio communications apparatus in response to receipt at the second radio communications apparatus from the first radio communications apparatus of a prior data packet. In some examples, the prior data packet includes a request for transmission of the anti-whitening data. The prior data packet may be a positioning data packet.

The method of the second aspect may further comprise generating the anti-whitening data for inclusion into the data packet based on of the prior data packet.

In some examples, the anti-whitening data includes the anti-whitened data portion for insertion into the second data packet. Additionally or alternatively, the anti-whitening data may include at least one parameter based on which the anti-whitened data portion for insertion into the second data packet is able to be generated.

In a third aspect, this specification describes an apparatus comprising: at least one processor; and at least one memory including computer program code, the at least one memory and the computer program code configured to, with the at least one processor, cause the apparatus at least to perform: inserting an anti-whitened data portion into a data packet that is to be whitened by whitening to yield a whitened data packet for transmission from a first radio communications apparatus to a second radio communications apparatus, the anti-whitened data portion having been determined based on anti-whitening data received from the second radio communications apparatus at the first radio communications apparatus, wherein the anti-whitened data portion is obtainable from a specific data block by anti-whitening, the anti-whitening compensating for the whitening so that the whitened data packet comprises the specific data block in non-whitened form.

The at least one memory and the computer program code of the apparatus of the third aspect may be further configured to, with the at least one processor, cause the apparatus to perform any of the operations or functions described above with reference to the method of the first aspect.

In a fourth aspect, this specification describes an apparatus comprising: at least one processor; and at least one memory including computer program code, the at least one memory and the computer program code configured to, with the at least one processor, cause the apparatus at least to perform: preparing for transmission, from a second radio communications apparatus to a first radio communications apparatus, a data packet including anti-whitening data usable to determine an anti-whitened data portion for insertion into a second data packet that is to be whitened by whitening by the first radio communications apparatus to yield a whitened data packet which is to be transmitted from the first radio communications apparatus to the second radio communications apparatus, wherein the anti-whitened data portion is obtainable from a specific data block by anti-whitening, the anti-whitening compensating the whitening by the first radio communications apparatus so that the whitened data packet to be received at the second radio communications apparatus comprises the specific data block in non-whitened form.

The at least one memory and the computer program code of the apparatus of the fourth aspect may be further configured to, with the at least one processor, cause the apparatus to perform any of the operations or functions described above with reference to the method of the second aspect.

In a fifth aspect, this specification describes computer-readable code, optionally stored on a non-transitory computer-readable memory medium which, when executed by computing apparatus, causes the computing apparatus to perform any of the methods of the first and second aspects.

In a sixth aspect, this specification describes an apparatus configured to perform any of the operations or functions described with reference the method of the first aspect.

In a seventh aspect, this specification describes an apparatus configured to perform any of the operations or functions described with reference the method of the second aspect.

In an eighth aspect, this specification describes apparatus comprising means for inserting an anti-whitened data portion into a data packet that is to be whitened by whitening to yield a whitened data packet for transmission from a first radio communications apparatus to a second radio communications apparatus, the anti-whitened data portion having been determined based on anti-whitening data received from the second radio communications apparatus at the first radio communications apparatus, wherein the anti-whitened data portion is obtainable from a specific data block by anti-whitening, the anti-whitening compensating for the whitening so that the whitened data packet comprises the specific data block in non-whitened form.

The apparatus of the eighth aspect may further comprise means for performing any of the other operations or functions described with reference to the method of the first aspect.

In an ninth aspect, this specification describes apparatus comprising means for preparing for transmission, from a second radio communications apparatus to a first radio communications apparatus, a data packet including anti-whitening data usable to determine an anti-whitened data portion for insertion into a second data packet that is to be whitened by whitening by the first radio communications apparatus to yield a whitened data packet which is to be transmitted from the first radio communications apparatus to the second radio communications apparatus, wherein the anti-whitened data portion is obtainable from a specific data block by anti-whitening, the anti-whitening compensating the whitening by the first radio communications apparatus so that the whitened data packet to be received at the second radio communications apparatus comprises the specific data block in non-whitened form.

The apparatus of the ninth aspect may further comprise means for performing any of the other operations or functions described with reference to the method of the second aspect.

BRIEF DESCRIPTION OF THE FIGURES

For a more complete understanding of the methods, apparatuses and computer-readable instructions described herein, reference is now made to the following descriptions taken in connection with the accompanying drawings in which:

FIG. 2A is a schematic diagram of an example of a communications apparatus which may be used in the system of FIG. 1;

FIG. 2B is a schematic diagram of an example of another communications apparatus with which the apparatus of FIG. 2B may communicate within the system of FIG. 1;

FIG. 3A is a flow chart illustrating examples of operations which may be performed by the communications apparatus of FIG. 2A;

FIG. 3B is a flow chart illustrating examples of operations which may be performed by the communications apparatus of FIG. 2B.

DETAILED DESCRIPTION OF EXAMPLES OF THE INVENTION

Figure 1:
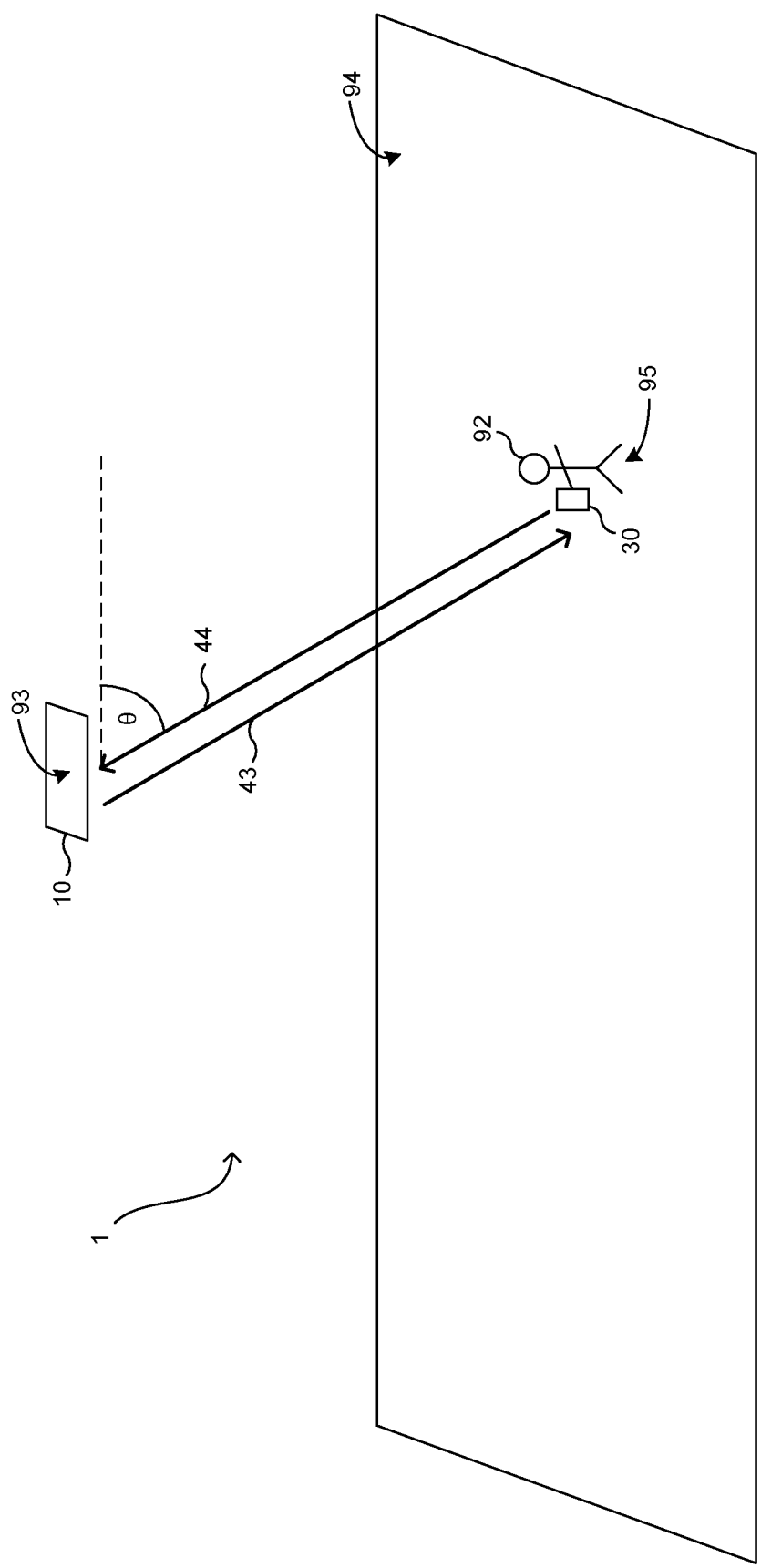
FIG. 1 illustrates schematically a positioning system for enabling determination of a communications apparatus within a space.

In the description and drawings, like reference numerals may refer to like elements throughout.

FIG. 1 schematically illustrates an example of a radio telecommunications system 1 within which embodiments of the invention may by used. More specifically, it illustrates a positioning system 1 which enables determination of a location 95 of a first radio communications apparatus 30 within a space 94, such as a building. The space 94 could be, for example, a shopping centre or a conference centre. The first radio communications apparatus 30 may be provided within a user-carried device such as, but not limited to, a mobile telephone, a smart watch, an electronic key fob. Equally, the first radio communications apparatus 30 may be provided within a device, such as a tag, which is affixed to another object and allows the location of that object within the space 94 to be monitored. It will thus be understood that in such examples, the first radio communications apparatus 30 may be referred to as a first radio communications apparatus or device.

In addition to the first radio communications apparatus 30, the positioning system 1 includes a second radio communications apparatus 10 at a different location 93 within the space. At least an antenna (or an array of antennas) from the second radio communication apparatus 10 may be provided in an electronic device whose location within the space 94 is relatively fixed. For instance, the antenna (or antennas) may be provided within or as part of a wireless router or within a dedicated positioning unit. The data processing functionality of the second radio communication apparatus 10 may be provided at any suitable point as long as it is able to transmit and/or receive data via the antenna (or antennas). It will also be appreciated that the data processing functionality of the second radio communication apparatus 10 might also be split between the relatively fixed location of the electronic device and another, possibly remote, location.

Such positioning systems are generally known in the art and aspects of these systems are described in various published patent applications including WO2007096279 and WO2010006651 which are hereby incorporated by reference. For this reason, only those features of the positioning system 1 that are useful for understanding embodiments of the invention will be discussed in this specification.

Briefly, one of the first radio communications apparatus 30 and the second radio communications apparatus 10 is configured (or operable) to cause transmission of a data packet 44, which may be referred to as a positioning data packet 44, to the other of the first radio communications apparatus 30 and the second radio communications apparatus 10. Based on receipt of this positioning data packet 44, it is possible to determine an angle θ from the apparatus which receives the positioning data packet 44 to that which transmits it. In the example of FIG. 1, the positioning data packet is transmitted by the first radio communications apparatus 30 and is received by the second radio communications apparatus 10. It will also be appreciated that the apparatuses 10, 30 in the system may additionally be operable transmit and/or receive packets of other types. For example, a packet 43, which may be other than a positioning packet and which will be discussed in more detail below, is illustrated in FIG. 1 passing between the two apparatuses 10, 30 in the opposite direction to the positioning data packet 44, i.e. from the second radio communications apparatus 10 to the first radio communications apparatus 30.

Although not shown in FIG. 1, one of the two apparatuses 10, 30 comprises an antenna array (not shown in FIG. 1, reference 12 in FIG. 2) consisting of at least two non-co-located (or phased) antennas. If the antenna array is deployed at the apparatus which transmits the positioning data packet 44, the so-called "angle-of-departure" (AoD) of the positioning data packet 44 can be determined. Alternatively, if the antenna array is deployed at the apparatus which receives the data positioning packet 44, the so called "angle-of-arrival" (AoA) can be determined.

If the antenna array is deployed at the apparatus which receives the positioning data packet 44, the different signal propagation delays (which cause different received signal phases and amplitudes) between a transmit antenna and the at least two antennas of the antenna array of the receiving apparatus allow estimation of a direction towards the transmitter. This approach is also known as "beamforming", because an antenna array can be controlled to have a beam-shaped direction-sensitive reception sensitivity that is exploited for direction estimation. Algorithms for estimating a direction of arrival based on a set of signals received with an antenna array of known aperture are well known in the art. Well-established examples of such algorithms are the so-called MUSIC algorithm, as described in reference "Multiple Emitter Location and Signal Parameter Estimation" by R. O. Schmidt, IEEE Transactions on Antennas and Propagation, vol. 34, no. 3, pages 276-280, March 1986, and the so-called ESPRIT algorithm, as described in reference "ESPRIT—Estimation of signal parameters via rotational invariance techniques" by R. Roy and T. Kailath, IEEE Transactions on Acoustics, Speech and Signal Processing, vol. 37, no. 7, pp. 984-995, July 1989.

When direction estimation is performed based on beamforming with an antenna array, the phase difference, as well as the amplitude difference, between the signals received by the antennas of the antenna array is measured. For instance, if we consider the antenna array depicted in FIG. 2A, measurement of the phase and/or amplitude differences between signals received at second and third antennas 12B, 12C with respect to a signal received at a first antenna 12A, which serves as a reference antenna in a three-element antenna array, may be performed. It may be desirable that the signal utilised for direction estimation is a commonly-used data packet (such as for instance a Wireless Local Area Network (WLAN) packet, a BT or BLE packet, or any other data packet), so that no special type of data packet has to be introduced to allow direction estimation.

In many wireless radio systems, a "data whitening" process is used to make the transmitted signal more noisy (or noise-like), for instance by adapting the signal so that long sequences of "0" or "1" are not present. However, when beamforming is performed based on a single-channel receiver (i.e. when a receiver has an antenna array with multiple antennas, but only one Radio Frequency (RF) reception chain or channel), such that only a signal received at one of the antennas can be processed at any one time, a transmitted signal with long sequences of "0"s or "1"s may be desired. This is because during such long sequences, the modulation-dependent signal characteristics of the transmitted signal (for instance the frequency in case of frequency modulation such as GMSK, or the phase in phase modulation such as Binary Phase Shift Keying (BPSK), Quaternary Phase Shift Keying (QPSK), etc., or the amplitude in amplitude modulation, or both phase and amplitude in Quadrature Amplitude Modulation) remain constant and, consequently, the estimation of the phase differences between the signals received at the multiple antennas is simplified. A portion of a data packet which is necessary for enabling the direction (e.g. the AoA) of the data packet to be determined may be referred to as a "specific data block". The specific data block may, therefore, be constructed of long sequences of "0"s and/or "1"s. More discussion regarding the use of positioning data packets including long sequences of "0"s and "1"s can be found in, for instance, WO2010.

It is thus clear from the above paragraph that "data whitening" may not be desirable when performing direction estimation using single channel receiver which includes an array of phased antennas. However, in some devices, which may be configurable to transmit positioning data packets, it may not be possible to avoid data whitening of the transmitted signal. As discussed, this may cause difficulties for the recipient of the positioning data packet when attempting to estimate the direction to the transmitting apparatus.

FIGS. 2A and 2B illustrate schematically examples of the configurations of the second radio communications apparatus 10 and the first radio communications apparatus 30 respectively. In these Figures, and examples discussed in detail in this specification, it is the mobile communications apparatus 30 that is configured to the transmit data positioning packets 44 and the antenna array 12 is deployed at the second radio communications apparatus 10. As such, in the examples described herein, it is the angle-of-arrival (AoA) that is determined. However, it will of course be appreciated from the below discussion that the invention is not limited in this way and that it might equally be deployed in a system in which the angle-of departure (AoD) is determined.

The apparatuses 10, 30 are, in some specific examples, configured to transmit signals via the Bluetooth Low Energy protocol. That is to say the apparatuses 10, 30 are able to operate in accordance with the BLE standard, currently at version 4.2 which is hereby incorporated by reference. Put another way, the apparatuses 10, 30 are in some specific examples "BLE-capable". However, although the specific embodiments described herein are directed primarily to use of Bluetooth Low Energy, it will be appreciated that the one or more signals transmitted and/or received in accordance with the invention may be based on a different wireless transmission protocol, such as but not limited to a protocol in accordance with Bluetooth Basic Rate, Bluetooth Enhanced Data Rate or one of the IEEE 802.11 specifications.

The second radio communications apparatus 10 of FIG. 2A comprises processing circuitry 14 and a storage device or memory 15. The storage device 15 has stored thereon computer readable code 15A which, when read by the processing circuitry 14, causes the processing circuitry 14 to control other components of the apparatus 10.

In this example, the apparatus 10 additionally comprises a transceiver 16. The apparatus 10 also comprises an antenna array 12 comprising a plurality of antenna elements 12A, 12B, 12C which are operable, for example under the control of the processing circuitry 14 and computer readable code 15A, to the receive data packets, including positioning data packets 44 from remote devices, such as the first radio communications apparatus 30 of FIG. 2B. Although three antenna elements 12A, 12B, 12C are shown, three is the minimum with which the Angle of Arrival can be calculated and the embodiments described herein may include more than three antenna elements. The antenna elements 12A, 12B, 12C may be arranged in the first radio communications apparatus 10 as is described in WO2007/0096729.

Each of the plurality of antenna elements 12A, 12B, 12C is connected to a switch 13, which may be controllable by the processing circuitry 14 operating under the control of computer readable code 15A stored in the storage device 15. The switch 13 is controlled so that only one of the antenna elements 12A, 12B, 12C is connected to the transceiver 16 at any one time.

The transceiver 16 or the processing circuitry 14 and memory 15 may provide de-whitening functionality for de-whitening whitened data packets received from the received from the tracked apparatus 30. In FIG. 2A, the de-whitening functionality 16 is shown within the transceiver 16. However, as mentioned, this functionality may instead be provided by, for instance, the processing circuitry 14 and memory 15.

The computer-readable code 15A, when loaded into processing circuitry 14 controls the operation of the first radio communications apparatus 10. The computer-readable code 15A provides the logic and routines that enable the apparatus 10 to perform the functionality described herein. Such functionality may include one or more of reception of wirelessly transmitted data packets 44, including but not limited to positioning data packets, transmission of wirelessly transmitted data packets, switching of the antenna elements 12A, 12B, 12C and estimation of the Angle-of-Arrival of positioning packets 44. The functionality may further include determination of the location of the mobile communications apparatus 30. The computer-readable instructions 15A are configured to cause the apparatus 10 to perform the operations described with reference to FIG. 3A.

Referring now to FIG. 2B, the first radio communications apparatus 30 comprises a controller 35. In this example, it further comprises a transceiver 36 and an antenna 37. The controller 35 is configured to control the transceiver 36 to transmit and receive via the antenna 37 wirelessly transmitted data packets 43, 44. In some specific embodiments, the wirelessly transmitted data packets that may be transmitted by via the antenna 37 include positioning data packets 44.

The transceiver 36 may comprise a whitening module 36A which is operable to whiten the data of signals transmitted by the transceiver 36. In other examples, the whitening may be performed by a component other than the transceiver 36. In any case, the whitening may be performed under control of the controller 35.

In BLE capable devices, the whitening may be applied to all PDU (protocol data unit) and CRC (cyclic redundancy check) fields of all Link Layer PDUs. The whitener may be defined using a 7-bit linear feedback shift register which is initialised with a sequence that is derived from the channel index of channel in which the data packet being whitened is carried out. The shift register may use the polynomial $x^7+x^4+1$. The whitening procedure used in BLE capable devices is described in more detail in the Bluetooth Specification Version 4.2 and so will not be discussed in more detail herein. Although BLE-capable devices may perform whitening in this manner, it will be appreciated that the embodiments of the invention are not limited by the way in which whitening is performed and that various different data whitening techniques may be used.

As mentioned above, this data-whitening may be undesirable as it may distort the specific data block of the data packet, the specific data block being that which allows the direction of origin of the data packet to be determined. In order to compensate for the unwanted whitening of the data packets, the controller 35 may be configured to control the transceiver 36 to receive one or more data packets from the second radio communications device 10 which include anti-whitening data. The controller 35 may also be configured to control the transceiver 36 to transmit data packets for eliciting transmission by the second radio communications apparatus 10 to the first radio communications apparatus 30 of a data packet which includes anti-whitening data.

The anti-whitening data may be used by the first radio communications apparatus 30 to counteract or compensate for the data whitening to which outgoing data packets are subjected. More specifically, the anti-whitening data may be used by the first radio communications apparatus to insert into a positioning packet an anti-whitened form of the specific data block. Consequently, when whitening is subsequently performed by the first radio communications apparatus 30, the specific data block is present in the whitened data packet in its non-whitened form. Put another way, the anti-whitening data may be used to code positioning data packets so that the specific data block will be received without whitening.

The anti-whitened form of the specific data block may be referred to as an anti-whitened portion and may be generated by performing anti-whitening on the specific data block. The anti-whitening compensates for the subsequent whitening, for instance in a way that a data block that has been anti-whitened and subsequently whitened equals the data block prior to the anti-whitening and whitening. Whitening may for instance be implemented by a linear feedback shift register. The anti-whitening may also be implemented by a linear feedback shift-register.

Since the anti-whitening performed on the specific portion block compensates the whitening performed on the data packet that is to be whitened, the whitened data packet comprises the specific data block in non-whitened form, whereas the rest of the whitened data packet is in whitened form. The anti-whitening performed on the specific data block thus compensates for a whitening operation.

It is thus possible to add data (the specific data block) to a data packet (the data packet that is to be whitened) before the whitening operation of this data packet and to still have this data (the specific data block) in non-whitened form after the whitening operation of the data packet. Specific properties of the specific data block may thus be preserved without requiring a whitening operation of a subsequent processing stage to be modified or disabled. The specific properties of the specific block may for instance be the usability of the specific data block for direction estimation with a single-channel multi-antenna transmitter and/or receiver.

The anti-whitened data that is received at the first radio communications apparatus from the second radio communications apparatus may include the anti-whitened data portion and/or data or parameters for enabling generation of the anti-whitened data portion. Where the anti-whitened data includes the anti-whitened data portion, the generation (or put another way the computation or calculation) of the anti-whitened data portion may be performed by the second radio communications apparatus 10 or by another apparatus with which the second radio communication apparatus 10 is in communication (although not the first radio communication apparatus 30). However, where the anti-whitening data includes data or parameters for allowing generation of the anti-whitened data portion, it may be generated by the first radio communications apparatus 30. In some cases, the anti-whitening data may include both the anti-whitened data portion and the parameters for enabling generation of the anti-whitened data portion. The format of the anti-whitening data will be discussed in more detail with reference to FIGS. 3A, 3B and 4.

Returning now to FIG. 3B, the controller 35 may be of any suitable construction but, in this example, the controller 35 comprises processing circuitry 32 and a storage device 34. The processing circuitry 32 is configured, under the control of computer-readable code 34A stored on the storage device 34, to control the operation of the transmission apparatus 30 to perform the operations described with reference to FIG. 3B.

The current BLE standard defines packets of different types. One such type is known as an advertising packet and these are transmitted on any of three different advertising channels. In some specific examples described herein, the communication apparatuses 10, 30 are capable of transmitting and receiving BLE advertising packets. In these examples, the data packets exchanged between the two apparatuses 10, 30 (as described with reference to FIGS. 3A, 3B and 4) may be BLE advertising packets. However, as will be appreciated by those skilled in the art, the invention is clearly not limited to the use of BLE advertising data packets and other types of packet, BLE or otherwise, may instead be used in order to implement the invention. Information regarding the different types of BLE data packets can be found in the Bluetooth specification version 4.2.

The first radio communications apparatus 30 of FIG. 2B may, for example, be a hand-held portable electronic device such as, but not limited to a mobile telephone, a tablet computer, a phablet, a navigation device, a media player, a personal digital assistant and a smart watch. In such examples, the apparatus may include other components such as but not limited to user input and output interfaces (e.g. a display and a touch or hover sensitive panel). As these components may not be important for carrying out the invention, these are not described in further detail in this specification. In other examples, the first radio communications apparatus may comprise a simple tag, of which input and output interfaces may not be a part.

Operations of the apparatuses 10, 30 of FIGS. 2A and 2B will now be described with reference to the flow charts of FIGS. 3A and 3B. FIG. 3A shows examples of operations which may be performed by the second radio communications apparatus 10 of FIG. 2A while FIG. 3B shows operations which may be performed by the first radio communications apparatus 30 of FIG. 2B. As the two apparatuses are operable to interact with one another, for instance by exchanging data packets, the operations of the two flow charts will be described concurrently. In addition, to aid understanding of the embodiments, the transfer of data packets between the first and second apparatuses 10, 30 is illustrated on the flow charts of FIGS. 3A and 3B.

In operation S3A.1, the second radio communications apparatus 10, which hereafter will be referred to as the "locating apparatus", causes a $1^{st}$ data packet 41 to be transmitted. This packet may be a BLE advertising packet. In some specific examples, the BLE advertising packet may be an ADV_IND packet, the format and function of which are described in the Bluetooth Specification Version 4.2 (see specifically Volume 6, part 2.3.1.1). The first data packet 41 may include a "capability identifier" for indicating to recipient devices that the locating apparatus 10 is capable of determining the location of the recipient devices. The capability identifier may, for example, be provided within the PDU payload of the data packet 41.

In operation S3B.1, the first radio communications apparatus 30 (which may hereafter be referred to as the "tracked apparatus") causes a scan for incoming data packets to be performed. Put another way, the tracked apparatus 30 is operable to enable receipt of the incoming first data packet 41 from the locating device 10.

Subsequently, in operation S3B.2-1, the tracked apparatus determines whether a locating or tracking service has been found. For instance, the tracked apparatus 30 may determine if the first data packet 41 was received from an apparatus that is capable of determining the location of the tracked apparatus 30 (or at least its direction). This may be performed, for instance, by examining the capability identifier included in the first data packet 41, if one is actually present.

If it is determined that the first data packet 41 was not received from an apparatus that is capable of determining the location or direction of recipient devices, the tracked apparatus 30 returns to operation S3B.1 and continues to scan for incoming data packets.

If, however, it is determined that the first data packet 41 was received from an apparatus that is capable of determining the location or direction of recipient devices, the tracked apparatus 30 may cause operation S3B.2-2 to be performed.

Although not shown in the Figures, in some examples, progression on to operation S3B.2-2, in the event of a determination that a locating or tracking service has been found, may occur only if an indication that use of the tracking service is desired has been provided to the tracked apparatus 30. This indication may be provided subsequent to the determination that the tracking service has been found, for instance by a user in response to a prompt from the tracked apparatus 30. Alternatively, the indication may have been provided previously by a user or it may be a default indication, for instance provided during manufacture or initial configuration of the apparatus 30.

In operation S3B.2-2, the tracked apparatus determines if anti-whitening data is required. This may, for instance, be based on an assessment of the capability of the tracked apparatus. For example, the apparatus 30 may be configured such that whitening can be disabled. In such an example, the apparatus 30 may recognise this capability and so determine that no anti-whitening data is required (i.e. a negative determination is reached). If, however, whitening is cannot be disabled a positive determination may be reached.

In other examples, the determination of S3B2-2 may be based on a consideration as to whether anti-whitening data is already available to the apparatus 30. For instance, it may have been received previously from the locating apparatus 10, may be retrievable from some other source such as the internet, or generic anti-whitening data may be pre-stored at the tracked apparatus 30. In such examples, if anti-whitening data is already available, the apparatus 10 may determine that anti-whitening data is not required and so a negative determination is reached. If, however, anti-whitening data is not available a positive determination may be reached.

In response to a negative determination in operation S3B.2-2, the method proceeds to operation S3.9 in which one or more positioning data packets 44 are caused to be transmitted by the tracked apparatus 30. In some examples, these positioning data packets 44 (when transmitted following a negative determination in operation S3B.2-2) may include an anti-whitened data portion which is determined based on the available anti-whitening data.

Following a positive determination in operation S3B.2-2, the tracked apparatus causes operation S3B.3 to be performed.

In S3B.3, the tracked apparatus prepares a second data packet 42 for transmission. This may include providing within the second data packet 42, a request for data whitening data to be received from the locating apparatus 10. Such a request may be included within a PDU payload of the second data packet 42. In a BLE capable, system the second data packet 42 may be a BLE advertising packet, such as an ADV_IND packet.

Figure 4:
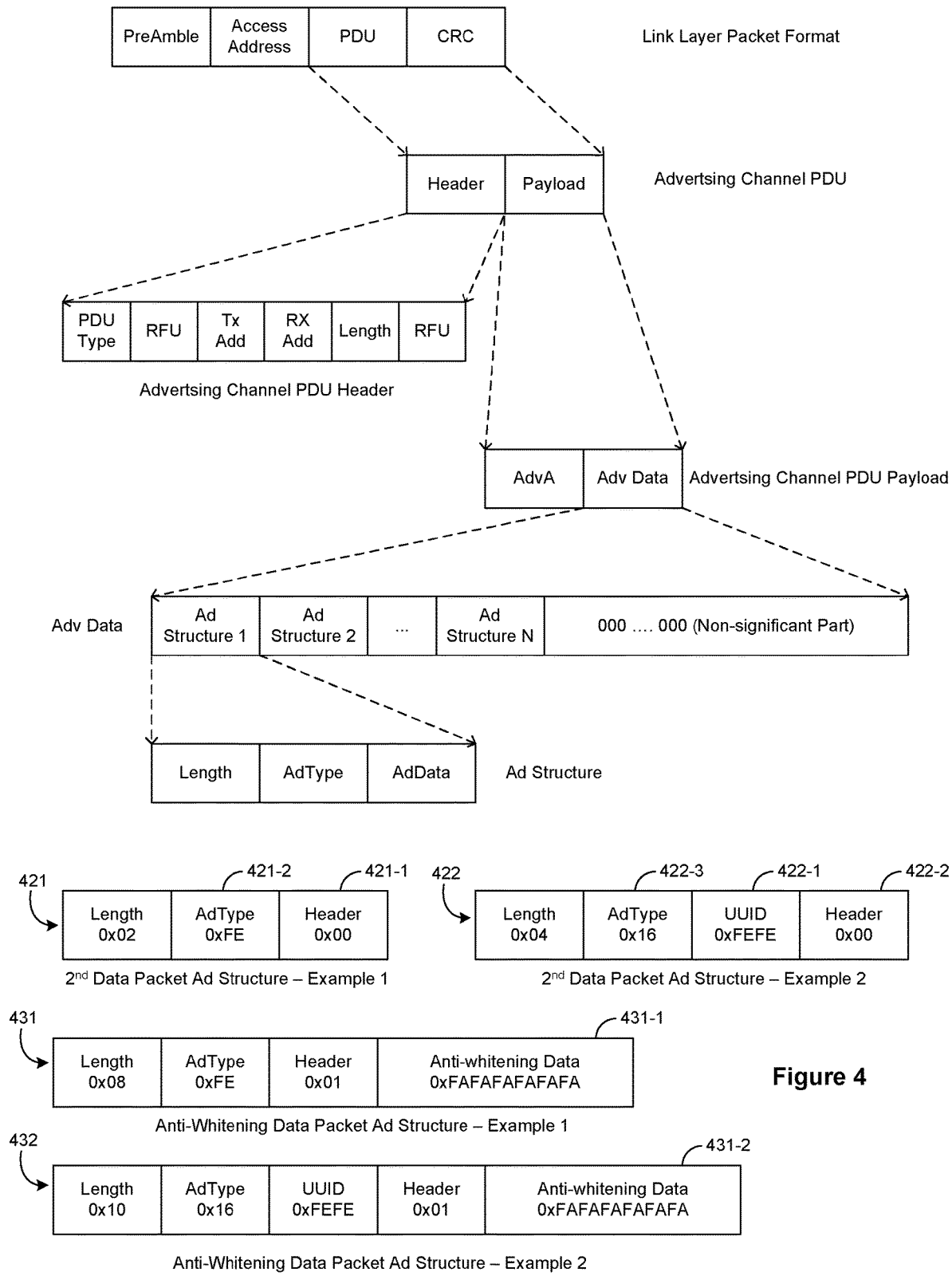
FIG. 4 illustrates schematically the structure of BLE data packets which may be transmitted and/or received by the apparatuses of FIGS. 2A and 2B.

FIG. 4 illustrates formats of the various data portions that make up a BLE data packet, which in this specific example is an "ADV_IND" BLE advertising packet. In FIG. 4, only those data portions which are relevant to the specific examples described herein are numbered and discussed. Details regarding the other data portions which make up the Link Layer Data Packet are not included in this specification but can be found in the Bluetooth Version 4.2 specification.

Examples of two different formats of BLE packets including requests for anti-whitening data are shown in FIG. 4, specifically in AD Structures 421 and 422 respectively. As is apparent from FIG. 4, the AD Structures 421, 422 including the request for anti-whitening data are sub-structures of the Adv Data of the Advertising Channel PDU payload of the BLE packet.

In the first example of structure 421, the AD type field 421-2 is configured to indicate that the data packet relates to a direction/location estimation service. The request for receipt of anti-whitening data is provided by configuration of the bits of the Header field 421-1. Dependent on the configuration of the bits of the Header 421-1, the locating apparatus 10 is able to determine if anti-whitening data is to be delivered to the tracked apparatus 30, and to respond accordingly.

In the second example of structure 422, the AD Type field refers to a UUID field 422-1 (which is also included in the AD structure) which may be 16 bits in length. In such an example, the AD Type field may specify an AD Type of «Service Data—16 bit UUID». The UUID field 422-1 may then be configured so as to indicate that the packet relates to a direction/location estimation service. As in the first example, the Header field 422-2 indicates whether anti-whitening data is required to be delivered.

In another example, which is not illustrated in FIG. 4, the AD Type and UUID fields may be used together to inform the locating apparatus 10 that anti-whitening data is required. For instance, an AD Type specifying «List of 16 bit Service Solicitation UUIDs» in combination with the configuration of the bits of the UUID field might be used to inform the locating apparatus 10 that the transmitter (i.e. the tracked apparatus 30) of the data packet requires anti-whitening data for use in a direction/location estimation service. In such an example, the header field may be obsolete.

Returning now to FIGS. 3A and 3B, in some examples operation S3B.3 may not include providing a specific request for anti-whitening data within the second data packet 42. Instead, the second data packet may simply be a normal positioning data packet (e.g. which includes the specific data block) but which does not include an explicit request for receipt of the anti-whitening data. In such an example, the normal positioning packet includes an indication that the packet relates to the location/direction estimation service, for instance in an AD Type field of the advertising channel PDU payload or using both the AD type field and the UUID field.

Subsequently, in operation S3B.4, the tracked apparatus 30 causes the second data packet 42, as prepared in operation S3B.3, to be transmitted to the locating apparatus 10. Prior to transmission, the second data packet 42 is whitened by the whitening unit 36A of the tracked apparatus 30.

Moving now to FIG. 3A, in operation S3A.2, the locating apparatus 10 causes a scan for incoming data packets to be performed. Put another way, the locating apparatus 10 enables receipt of the second data packet 42 from the tracked apparatus 30.

Next, in operation S3A.3, the locating apparatus 10 determines whether or not the data packet relates to a location/direction estimation service. This may be performed, for instance, by examining the header and/or UUID field of the incoming data packet. If it is determined that the data packet 42 does relate to a location/direction estimation service (for instance because this is indicated by the configuration of the header and/or UUID field), the location apparatus causes operation S3A.4 to be performed. If it is determined that the data packet 42 does not relate to the location/direction estimation service, the locating apparatus 10 may return to one of operations S3A.1 and S3A.2.

In operation S3A.4, the locating apparatus 10 determines whether the direction of the tracked device is determinable based on the received second data packet. This may be determined by examining the second data packet 42 (or data packet 44) to determine if a request for anti-whitening data is present. For instance, one or more fields of the payload of the second data packet 42, such as the Header and/or UUID fields, may be examined. If such a request is present, the locating apparatus 30 proceeds to operations S3A.5 to 3A.7 in which the anti-whitening data is provided to the tracked apparatus 30.

Alternatively, in operation S3A.4, instead of examining the data packet 42 for a request, the locating apparatus 10 may simply attempt to determine the direction of the tracked device using the representation of the second data packet 42 (or positioning data packet 44). If it is not possible for the locating apparatus 10 to determine the direction of the tracked apparatus 30 (which may be a result of the whitening performed by the tracked apparatus 30 altering the specific data block), the locating apparatus 10 may respond by performing operations S3A.5 to S3A.7, thereby providing the anti-whitening data to the tracked apparatus 30.

It will be understood that in both alternatives described with reference to operation S3A.4 (i.e. regardless of whether a request for anti-whitening data is included in the second data packet 42 or not), the second data packet 42 (or the positioning data packet 44), which is caused to be transmitted by the tracked apparatus 30, elicits transmission of the anti-whitening data from the locating apparatus 10. Put another way, the second data packet 42 (or the positioning data packet 44) is suitable for eliciting delivery of the anti-whitening data from the locating apparatus 30 to the tracked apparatus 10.

If, in operation S3A.4, it is determined that the direction of the tracked apparatus 30 can be estimated based on the received data packet, the locating apparatus 10 causes operation S3A.8 to be performed. In operation S3A.8, the locating apparatus 10 causes estimation of the direction towards the tracked device 30 to be estimated. It will be appreciated that a positive determination will not be reached in S3A.4 based on the second data packet 42 having the format described previously. A positive determination may be reached however if, for example, following a negative determination in S3B.2-2, a positioning data packet 44 is transmitted and the tracked apparatus 30 does not apply data whitening (for instance, because data whitening can be disabled). Similarly, a positive determination may be reached if anti-whitening data which was previously available to the tracked apparatus 30 is still correct (and so the format and position of the anti-whitened data portion in the positioning data packet 44 is also correct).

If a negative determination is reached in operation S3A.4, for instance because previously available anti-whitening data was no longer applicable (e.g. because a different channel is being used and/or additional data is included in the data packet) and/or because the second data packet 42 is not a positioning data packet including the specific data block necessary for direction estimation, the locating apparatus 10 proceeds to cause performance of operation S3A.5.

In operation S3A.5, the locating apparatus 10 causes anti-whitening data to be generated. The generation of the anti-whitening data may be on the basis of the format of the received second data packet 42. For instance, the locating apparatus 10 may perform anti-whitening on the entire second data block 42. After anti-whitening, the anti-whitened specific data block (also referred to as the anti-whitened data portion) may be extracted for transmission back to the locating apparatus 30.

The generated anti-whitening data may additionally or alternatively include any suitable combination of: data identifying the frequency channel used by the locating apparatus 10 (which may be used to configure the shift register used by tracked apparatus for performing data whitening); an indication of the format of the specific data block; a start index for the specific data block, which indicates the position in the packet at which the specific data block should be included; and a length of the specific data block. The indication of the format of the specific data block may for instance indicate whether it is to be comprised of a sequence of "1"s or a sequence of "0"s.

As will be understood, the actual form of the anti-whitened portion may depend on the form of the entire positioning data packet and not just the form of the specific data block. Consequently, as the application layer at the tracked apparatus 30 may not know the specific form of the positioning data packet after it passes its PDU to the link layer (for instance due to headers etc that are provided in the link layer), it may not be possible for the tracked apparatus 30 to generate the anti-whitened data portion correctly without receiving guidance (for instance, the anti-whitening data) from the locating device 30.

Depending on the information included in the anti-whitening data, upon receipt the tracked apparatus 30 may be able to compute the anti-whitened data block and insert this into a positioning data packet for transmission back to the locating apparatus 10. This computation may be performed based on: the data identifying the frequency channel used by the locating apparatus 10; the indication of the format of the specific data block; the start index for the specific data block; and the length of the specific data block. In some examples, the first communication apparatus 30 may already know the frequency channel being used or the data whitening may not be dependent on the channel frequency. In such examples, the data identifying the frequency channel may not be required for the computation. It will thus be understood that, in some examples, the data identifying the frequency channel may be omitted from the anti-whitening data.

Alternatively, if the anti-whitened data block is included in the anti-whitening data, the tracked apparatus 30 may simply be able to extract this and insert it at the correct location in a positioning data packet for transmission back to the locating apparatus 10. In some examples, if the positioning data packet is to include no other payload, the anti-whitened data portion may simply be "copied-and-pasted" directly into the packet as the PDU payload. In other examples, however, where other data is to be included in the payload in addition to the specific data block, one or more of the start index for the specific data block; and the length of the specific data block may be utilised to insert the anti-whitened data portion into the correct location in the positioning data packet.

After generating the anti-whitening data, in operation S3A.6, the locating apparatus 10 causes a data packet which includes the anti-whitening data to be prepared. Within a BLE-capable system, the locating apparatus 10 may be configured to include the anti-whitening data within the BLE data packet in accordance with the GAP (Generic Access Profile) Protocol.

FIG. 4 shows two examples of AD structures for the anti-whitening data packet including the anti-whitening data. The first example corresponds to the first example of the AD structure 421 received as part of the second data packet 42 and the second example corresponds to the second example 422. In both examples, the anti-whitening data AD structures 431, 432 have a format that is similar to the received ad-structure 421, 422 but have an anti-whitening data portion 431-1, 431-2 appended thereto. The locating device 10 may also be configured to alter the contents of the bits of the header field to indicate that the anti-whitening data portion is included in the AD structure 421, 422.

Returning now to FIG. 3A, in operation S3A.7, the locating apparatus 10 causes transmission of the anti-whitening data packet 43 including the anti-whitening data 431-1, 432-1 to the tracked apparatus 30. The anti-whitening data packet 43 may be a BLE data packet. More specifically, the anti-whitening data packet 43 may be a BLE advertising data packet, such as an ADV_IND type advertising packet. After this, the locating apparatus 30 returns to operation S3A.2. Data packet 43 may also include, for example, an address, or some other identifier, of the intended recipient (in this case the tracked apparatus 30). In this way, the tracked apparatus 30 may determine whether it has received the correct anti-whitening data.

In operation S3B.5, the tracked apparatus causes a scan for incoming data packets to be performed. Put another way, the tracked apparatus 30 enables receipt of the incoming anti-whitening data packet.

Next, in operation S3B.6, the tracked apparatus 30 determines whether or not the received data packet includes anti-whitening data 431-1, 432-1. If the packet 43 does include anti-whitening data 431-1, 432-1, the tracked apparatus proceeds to one of operations S3B.7 and S3B.8. If, however, it is determined that the received data packet 43 does not include anti-whitening data, the tracked apparatus 30 may return, for instance, to operation S3B.5 to scan for incoming data packets. In examples in which the data packet 43 includes an address (or some other identifier) of the intended recipient, operation S3B.6 may include determining if the tracked apparatus 30 is the intended recipient of the packet 43. If the tracked apparatus 30 is not the intended recipient, a negative determination may be reached. If it is determined that the tracked apparatus 30 is the intended recipient, a positive determination is reached.

In operation S3B.7, the tracked apparatus causes the anti-whitened data portion to be generated. This is performed on the basis of the received anti-whitening data. For instance, it may be performed on the basis of data identifying the frequency channel used by the locating apparatus 10 (which may be used to configure the shift register used by tracked apparatus 30 for performing data whitening); the indication of the format of the specific data block; the start index; and the length of the specific data block, if such is included in the anti-whitening data.

It will, of course, be appreciated that in some examples the tracked apparatus 30 does not generate the anti-whitened data portion. This may be because the anti-whitened data portion may be included in the anti-whitening data received from the locating apparatus 10. Consequently, generation of the anti-whitened portion by the tracked apparatus 30 may not be required.

Next, in operation S3B.8, the tracked apparatus 30 inserts the anti-whitened data portion into a data packet for transmission to the locating apparatus 10. The anti-whitened data portion may be inserted into a positioning data packet in place of the specific data block.

Once the data packet including the anti-whitened data portion has been prepared, the tracked apparatus 30 causes the data packet 44 including the anti-whitened data portion to be transmitted to the locating apparatus 10.

Immediately prior to transmission, the data packet 44 including the anti-whitened data portion is whitened by the whitening module 36A. The result of this whitening is a whitened data packet 44 which includes the specific data block in non-whitened form.

As mentioned above, after transmitting the anti-whitening data in operation S3A.7, the locating apparatus 10 returns to scanning for incoming packets in operation S3A.2. During this scanning procedure, the locating apparatus 10 receives the whitened data packet 44 including the anti-whitened data portion. Next, operation S3A.3 is performed, in which the locating apparatus determines if the service relates to the direction estimation service. Following a positive determination, the locating apparatus 10 performs operation S3A.4, in which it is determined if it is possible to estimate the direction of origin of the data packet. If computation and insertion of the anti-whitened data portion were performed correctly, and if the other data preceding the anti-whitened portion within the data packet 44 was not altered (for instance, in length) by the tracked apparatus 30 after the anti-whitened portion was generated, a positive determination will be reached. In such cases, the tracked apparatus 30 proceeds to operation S3A.8 to estimate the direction of origin of the data packet 44. This is performed based on a received representation of the specific data portion.

If, however, an error occurred with respect to the computation or insertion of the anti-whitening data portion or if the other data preceding the anti-whitened data portion was altered (e.g. a change in length or a change in the name of the tracked apparatus) after computation of the anti-whitened data portion, the locating apparatus 10 may determine that it is not possible to estimate a direction of the origin of the data packet 44. In the event of such a negative determination, the locating apparatus 10 may repeat operations S3A.5 to S3A.6, thereby to re-generate and cause transmission of anti-whitening data, which may be updated in view of the altered data packet 44, to the tracked apparatus 30. A change in length of the data in the packet 44 preceding the anti-whitened data portion may occur for instance if additional advertisement data has been added to the data packet 44.

The tracked apparatus 30 will then receive, in a repeat of operation of S3B.5, another data packet 43, with this one including the re-generated anti-whitening data. After receiving the re-issued anti-whitening data packet 43, the tracked apparatus 30 re-performs operations S3B.8 and S3B.9 and, in some examples, also operation S3B.7. As such, a new data packet 44 including an anti-whitened data portion is whitened and transmitted to the locating apparatus 10. Operations S3A.2 to S3A.4 of the locating apparatus 10 and operations S3B.5 to S3B.9 of the tracked apparatus 30 are then repeated until a positive determination is reached by the locating apparatus 10 in operation S3A.4. At that point, the locating apparatus 10 proceeds to estimate the direction of origin of the anti-whitened data packet 44.

The locating apparatus 10 may be operable to return to operation S3A.2 subsequent to estimating the direction of the origin of the anti-whitened data packet. As such, the locating apparatus 10 may scan for further positioning packets received from the tracked apparatus 30. Once a further packet is received, various ones of operations S3A.3 to S3A.8 are repeated in dependence on the determinations reached in S3A.3 and S3A.4. Similarly, the tracked apparatus 30 may be configured to repeat transmission of anti-whitened positioning data packets. For instance, after transmitting an anti-whitened packet in operation S3B.9, the apparatus 30 may return to scanning for received packets (for example in operation S3B.5). If no packets (for instance, including updated anti-whitening data) are received within a particular time period, the tracked apparatus 30 may then proceed to one of operations S3B.7 to S3B.9, thereby resulting in another anti-whitened positioning packet 44 being transmitted. Repeated transmission of anti-whitened positioning packets, by the tracked apparatus 30 and determination of their direction of origin, by the locating apparatus 10, enable the determined direction to be refined. The tracked apparatus 30 may be configured to transmit a pre-defined number of repeated positioning packets 44. The predefined number may be sufficient to enable an estimation of the direction of a reasonable/acceptable accuracy to be made by the locating apparatus 10.

As will be appreciated, the flow charts of FIGS. 3A and 3B are examples only. As such, various operations may be modified or omitted. For instance, in some examples, operation S3A.3 and/or operation S3B.7 may be omitted. Similarly in some instances, operation S3B.2-2 may be omitted. In such examples, following a positive determination in operation S3B.2-1, the method may proceed directly to operation S3B.3 or instead may proceed directly to operation S3B.9. In examples in which the method proceeds directly to operation S3B.9, the transmitted positioning packet 44 may include an anti-whitened data portion (if, for instance, anti-whitening data is already available to the tracked apparatus 30) or may be a conventional positioning packet including a regular specific data portion which has not been anti-whitened. Likewise, in some instances, the order in which the operations are performed may be different to those depicted.

Various embodiments, including those described herein, enable devices, for which tracking would be useful but which do not include the option to disable data whitening prior to transmission, to be tracked within an HAIP system. As the changes required may be provided solely in software, with no hardware changes being necessary, existing devices which are already being used may be adapted for use within an HAIP system. This may, for instance, allow personnel within a particular industry or service (such as healthcare) to be trackable at all times within a particular building using existing portable devices (e.g. smart watches or mobile telephones) without the need to issue additional tracking tags.

In some examples, the locating apparatus 10 may be configured to operate (e.g. transmit and receive data packets) using on a single physical channel, for instance, one of the three available BLE advertising channels. This may be beneficial if the apparatus 10 is part of a positioning system including plural locating apparatuses. This is because if other locating apparatuses in the system are configured to utilise a single, different channel, occurrences of collisions and channel congestion may be reduced.

Some further details of components and features of the above-described apparatuses 10, 30 and alternatives for them will now be described.

The processing circuitry 14, 32 of the apparatuses 10, 30 of FIGS. 2A and 2B may be of any suitable composition and may include one or more processors 14A, 32A. For example, the processing circuitry 14, 32 may be a programmable processor that interprets computer program instructions and processes data. The processing circuitry 14, 32 may include plural programmable processors. Alternatively, the processing circuitry 14, 32 may be, for example, programmable hardware with embedded firmware. The processing circuitry may be termed processing means. The processing circuitry may alternatively or additionally include one or more Application Specific Integrated Circuits (ASICs). In some instances, the processing circuitry may be referred to as computing apparatus.

The processing circuitry 14, 32 is coupled to the respective storage device 15, 34 and is operable to read/write data to/from the storage device (or memory) 15, 34. The storage devices 15, 34 may comprise a single memory unit or a plurality of memory units, upon which the computer readable code 34A is stored. For example, the storage devices 15, 34 may comprise both volatile memory and non-volatile memory. For example, the computer readable instructions 15A, 34A may be stored in the non-volatile memory and may be executed by the processing circuitry 14, 32 using the volatile memory for temporary storage of data or data and instructions. Examples of volatile memory include RAM, DRAM, SDRAM etc. Examples of non-volatile memory include ROM, PROM, EEPROM, flash memory, optical storage, magnetic storage, etc.

The computer readable instructions 14A, 34A may be pre-programmed into the apparatuses 10, 30. Alternatively, the computer readable instructions 34A, 15A may arrive at the apparatus 30 via an electromagnetic carrier signal or may be copied from a physical entity 21 (see FIG. 2A) such as a computer program product, a memory device or a record medium such as a CD-ROM or DVD. The computer readable instructions 14A, 34A may provide the logic and routines that enables the devices/apparatuses 10, 30 to perform the functionality described above.

Where applicable, the BLE-capability of each of the apparatuses 10, 30 may be provided by a single integrated circuit. It may alternatively be provided by a set of integrated circuits (i.e. a chipset). The BLE-capability may alternatively be a hardwired, application-specific integrated circuit (ASIC).

Although the specific embodiments have been described primarily with reference to Bluetooth Low Energy (BLE), it will be appreciated that other protocols which allow angle of arrival of a packet to be determined may alternatively be used. Such protocols may include 802.11 wireless local area network protocols, other types of Bluetooth protocol, Ultra wideband (UWB) protocols or Zigbee protocols.

As will be appreciated, the apparatuses 10, 30 described herein may include various components which have not been shown in the Figures. For example, the mobile radio communications apparatus may comprise an additional communication interface which may be configured to allow two-way communication with external devices and/or networks. The communication interface may be configured to communicate wirelessly via one or more of several protocols such as Global System for Mobile Communications (GSM), Code Division Multiple Access (CDMA), Universal Mobile Telecommunications System (UMTS) and IEEE 802.11 (Wi-Fi). Alternatively or additionally, the communication interface 114 may be configured for wired communication with a device or network. The apparatuses 10, 30 may include other components depending on their nature. For example the first radio communications apparatus 30, in embodiments in which it is a mobile telephone may further include components such as a microphone, a speaker, one or more camera modules and a vibration module to name but a few. Similarly, the second radio communications apparatus 10 may, in examples in which it is a wireless router, additionally include wireless routing components.

The apparatuses 10, 30 may comprise further optional SW components which are not described in this specification since they may not have direct interaction to embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "storage device" or "computer-readable medium" may be any media or means that can contain, store, communicate, propagate or transport the instructions for use by or in connection with an instruction execution system, apparatus, or device, such as a computer.

Reference to "computer-readable storage medium", "computer program product", "tangibly embodied computer program" etc, or a "processor" or "processing circuitry" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories.

If desired, the different functions discussed herein may be performed in a different order and/or concurrently with each other. Furthermore, if desired, one or more of the above-described functions may be optional or may be combined.

The use of the terms "prior" and "subsequent" within this specification may denote a relative order at which events occurred. For instance, a "prior" data packet may have been transmitted and/or received earlier in time than the/a data packet. Similarly, a subsequent data packet may have been transmitted and/or received at a later time than both a prior data packet and the/a data packet.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method comprising:
   inserting an anti-whitened data portion into a data packet that is to be whitened by whitening to yield a whitened data packet for transmission from a first radio communications apparatus to a second radio communications apparatus, and
   causing the anti-whitened data portion to be determined based on anti-whitening data received from the second radio communications apparatus at the first radio communications apparatus,
   wherein the anti-whitened data portion is obtainable from a specific data block by anti-whitening, the anti-whitening compensating for the whitening so that the whitened data packet comprises the specific data block in non-whitened form, and
   wherein the specific data block is configured to be used by the second radio communications apparatus to estimate a direction towards the first radio communications apparatus based on a received representation of the specific data block.

2. The method of claim 1, comprising enabling receipt at the first radio communications apparatus from the second radio communications apparatus of the anti-whitening data.

3. The method of claim 1, comprising preparing, for transmission from the first radio communications apparatus, a prior data packet for eliciting transmission of the anti-whitening data by the second radio communications apparatus to the first radio communications apparatus, to include at least one of,
   a) wherein the prior data packet includes a request for transmission of the anti-whitening data,
   or
   b) wherein the prior data packet is a positioning data packet.

4. The method of claim 3, comprising:
   determining whether the anti-whitening data is required to be received;
   a) wherein if it is determined that the anti-whitening data is required to be received, preparing the prior data packet, including the request for transmission of the anti-whitening data, for transmission;
   or
   b) wherein if it is determined that the anti-whitening data is not required to be received, preparing of a positioning data packet for transmission.

5. The method of claim 1, Wherein the received anti-whitening data includes the anti-whitened data portion for insertion into the data packet, or
wherein the received anti-whitening data includes at least one parameter based on which the anti-whitened data portion for insertion into the data packet is able to be generated.

6. The method of claim 5, comprising generating the anti-whitened data portion using the received anti-whitening data.

7. The method of claim 1, comprising responding to receipt at the first radio communications apparatus from the second radio communications apparatus of subsequently-received anti-whitening data, by inserting a subsequent anti-whitened data portion into a subsequent data packet that is to be whitened by Whitening to yield a subsequent whitened data packet for transmission from the first radio communications apparatus to the second radio communications apparatus, the subsequent anti-whitened data portion having been determined based on the subsequently-received anti-whitening data.

8. A method comprising:
preparing for transmission, from a second radio communications apparatus to a first radio communications apparatus, a data packet including anti-whitening data usable to determine an anti-whitened data portion for insertion into a second data packet that is to be whitened by whitening by the first radio communications apparatus to yield a whitened data packet which is to be transmitted from the first radio communications apparatus to the second radio communications apparatus,
wherein the anti-whitened data portion is obtainable from a specific data block by anti-whitening, the anti-whitening compensating the whitening by the first radio communications apparatus so that the whitened data packet to be received at the second radio communications apparatus comprises the specific data block in non-whitened form, and
using, by the second radio communications apparatus, the specific data block to estimate a direction towards the first radio communications apparatus based on a received representation of the specific data block.

9. An apparatus comprising:
at least one processor; and
at least one memory including computer program code, the at least one memory and the computer program code configured to, with the at least one processor, cause the apparatus at least to perform:
inserting an anti-whitened data portion into a data packet that is to be whitened by whitening to yield a whitened data packet for transmission from a first radio communications apparatus to a second radio communications apparatus, and
causing the anti-whitened data portion to be determined based on anti-whitening data received from the second radio communications apparatus at the first radio communications apparatus,
wherein the anti-whitened data portion is obtainable from a specific data block by anti-whitening, the anti-whitening compensating for the whitening so that the whitened data packet comprises the specific data block in non-whitened form, and
wherein the specific data block is configured to be used by the second radio communications apparatus to estimate a direction towards the first radio communications apparatus based on a received representation of the specific data block.

10. The apparatus of claim 9, the at least one memory and the computer program code being configured to, with the at least one processor, cause the apparatus to perform:
enabling receipt at the first radio communications apparatus from the second radio communications apparatus of the anti-whitening data.

11. The apparatus of claim 9, the at least one memory and the computer program code being configured to, with the at least one processor, cause the apparatus to perform:
preparing, for transmission from the first radio communications apparatus, a prior data packet for eliciting transmission of the anti-whitening data by the second radio communications apparatus to the first radio communications apparatus which includes at least one of:
a) wherein the prior data packet includes a request for transmission of the anti-whitening data,
or
b) wherein the prior data packet is a positioning data packet.

12. The apparatus of claim 11, the at least one memory and the computer program code being configured to, with the at least one processor, cause the apparatus to perform:
determining whether the anti-whitening data is required to be received;
if it is determined at least one of the following:
a) that the anti-whitening data is required to be received, preparing the prior data packet, including the request for transmission of the anti-whitening data, for transmission,
or
b) if it is determined that the anti-whitening data is not required to be received, preparing a positioning data packet for transmission.

13. The apparatus of claim 11, wherein the received anti-whitening data includes the anti-whitened data portion for insertion into the data packet, or
wherein the received anti-whitening data includes at least one parameter based on which the anti-whitened data portion for insertion into the data packet is able to be generated.

14. The apparatus of claim 13, the at least one memory and the computer program code being configured to, with the at least one processor, cause the apparatus to perform:
generating the anti-whitened data portion using the received anti-whitening data.

15. The apparatus of claim 12, the at least one memory and the computer program code being configured to, with the at least one processor, cause the apparatus to perform:
responding to receipt at the first radio communications apparatus from the second radio communications apparatus of subsequently-received anti-whitening data, by inserting a subsequent anti-whitened data portion into a subsequent data packet that is to be whitened by whitening to yield a subsequent whitened data packet for transmission from the first radio communications apparatus to the second radio communications apparatus, the subsequent anti-whitened data portion having been determined based on the subsequently-received anti-whitening data.

16. An apparatus comprising:
at least one processor; and
at least one memory including computer program code, the at least one memory and the computer program code configured to, with the at least one processor, cause the apparatus at least to perform:

preparing for transmission, from a second radio communications apparatus to a first radio communications apparatus, a data packet including anti-whitening data usable to determine an anti-whitened data portion for insertion into a second data packet that is to be whitened by whitening by the first radio communications apparatus to yield a whitened data packet which is to be transmitted from the first radio communications apparatus to the second radio communications apparatus, wherein the anti-whitened data portion is obtainable from a specific data block by anti-whitening, the anti-whitening compensating the whitening by the first radio communications apparatus so that the whitened data packet to be received at the second radio communications apparatus comprises the specific data block in non-whitened form, and using, by the second radio communications apparatus, the specific data block to estimate a direction towards the first radio communications apparatus based on a received representation of the specific data block.

* * * * *